United States Patent
Patel et al.

(10) Patent No.: US 8,677,731 B2
(45) Date of Patent: Mar. 25, 2014

(54) HYBRID SLINGER COMBUSTION SYSTEM

(71) Applicant: Pratt & Whitney Canada Corp., Longueuil (CA)

(72) Inventors: Bhawan B. Patel, Mississauga (CA); Oleg Morenko, Oakville (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 13/915,990

(22) Filed: Jun. 12, 2013

(65) Prior Publication Data

US 2013/0327054 A1  Dec. 12, 2013

Related U.S. Application Data

(62) Division of application No. 13/071,997, filed on Mar. 25, 2011, now Pat. No. 8,479,492.

(51) Int. Cl.
 *F02C 9/26* (2006.01)
 *F23R 3/38* (2006.01)

(52) U.S. Cl.
 USPC ................................ 60/204; 60/243; 60/745

(58) Field of Classification Search
 USPC ............................ 60/744, 745, 243, 776, 204
 See application file for complete search history.

(56) References Cited

U.S. PATENT DOCUMENTS

| | | | |
|---|---|---|---|
| 2,880,573 A | 4/1959 | Karcher | |
| 3,124,933 A | 3/1964 | Stram, Jr. et al. | |
| 3,381,471 A | 5/1968 | Szydlowski | |
| 3,460,345 A | 8/1969 | Greenwood | |
| 4,040,251 A | 8/1977 | Heitmann et al. | |
| 4,441,156 A | 4/1984 | Barbeau | |
| 4,996,838 A | 3/1991 | Melconian | |
| 5,003,766 A | 4/1991 | Paul | |
| 6,453,676 B1 | 9/2002 | Ho et al. | |
| 6,988,367 B2 | 1/2006 | Thompson, Jr. et al. | |
| 7,036,321 B2 | 5/2006 | Dudebout et al. | |
| 7,568,343 B2 | 8/2009 | Harris et al. | |
| 7,762,072 B2 | 7/2010 | Critchley et al. | |
| 8,479,492 B2 * | 7/2013 | Patel et al. ................. | 60/243 |

OTHER PUBLICATIONS

GE Avaiation: Engine Education, http://www.geaviation.com/education/vocabulary.html, copyright 2012.*

* cited by examiner

*Primary Examiner* — Ted Kim
(74) *Attorney, Agent, or Firm* — Norton Rose Fulbright Canada LLP

(57) ABSTRACT

A hybrid combustor combines two distinct fuel injection sources to spray fuel in the combustor. The combustor combines a rotary fuel slinger for spraying fuel in a first combustion zone during high power level and cruise conditions and a set of fuel nozzles for spraying fuel in a second combustion zone during lower power level and starting conditions.

5 Claims, 5 Drawing Sheets

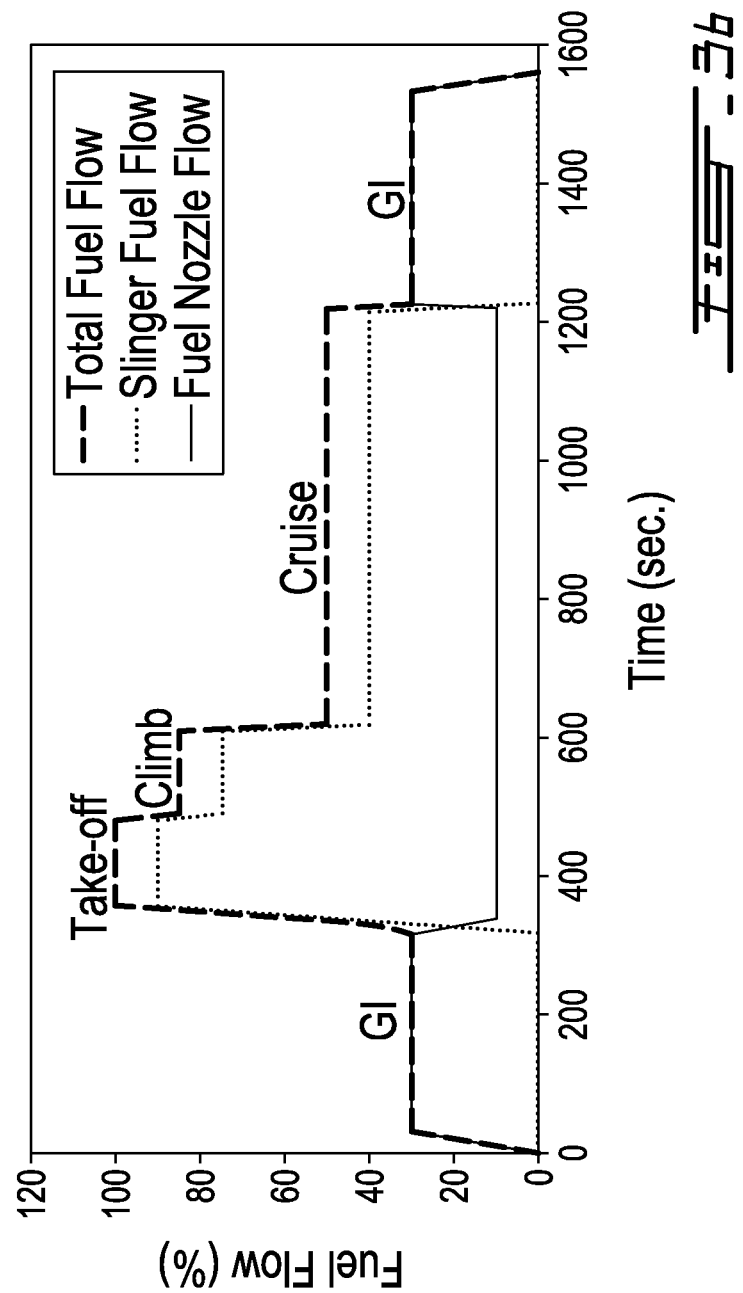

HYBRID SLINGER COMBUSTION SYSTEM

RELATED APPLICATIONS

This application is a divisional of U.S. patent application Ser. No. 13/071,997 filed on Mar. 25, 2011 now U.S. Pat. No. 8,479,492, the content of which is hereby incorporated by reference.

TECHNICAL FIELD

The application relates generally to gas turbine engines and, more particularly, to a hybrid system for injecting fuel into a combustor.

BACKGROUND OF THE ART

Gas turbine engines used for powering aircrafts comprise a combustor in which fuel is mixed with compressed air and ignited to provide combustion gases for the turbine section of the engine. In a slinger combustion system, fuel is delivered and atomized through spraying fuel through a rotary fuel slinger. The rotary fuel slinger is designed for maximum fuel flow and optimized for cruise condition to improve the combustion efficiency and thus reduce smoke and gaseous emission. Thus at low power levels, when the slinger rotates at lower speeds, fuel tends to not atomize properly, thereby resulting in low combustion efficiency, and high emission/smoke/particulates/unburned hydrocarbons.

Conventional rotary slingers have to be operated at high speed for properly atomizing the fuel. When, the slinger is rotated at low speeds, such as during starting and altitude relight conditions, the fuel atomization effect of the slinger is relatively poor, thereby requiring a relatively expensive and complex architecture for the ignition system with relatively long igniters to deliver spark energy close to the slinger system. Starting a slinger combustor at low speeds and at high altitudes without relatively complex high pressure fuel injection system has heretofore been challenging.

SUMMARY

In one aspect, there is provided a hybrid slinger combustor system for an aero gas turbine engine powering an aircraft, the combustor system comprising a combustor shell defining a combustion chamber, the combustion chamber having first and second combustion zones; two distinct fuel injector units for respectively spraying fuel into said first and second combustion zones, said two distinct fuel injector units including a rotary fuel slinger for spraying fuel radially outwardly into the first combustion zone, and a set of circumferentially spaced-apart fuel nozzles for spraying fuel into the second combustion zone; and a control unit controlling the rate of fuel flow to said rotary fuel slinger and said set of fuel nozzles as a function of the power demand of the gas turbine engine.

In a second aspect, there is provided a method for improving the combustion efficiency of a combustor of a gas turbine engine powering an aircraft, comprising: selectively using two distinct fuel injection units or a combination thereof for spraying fuel in a combustion chamber of the combustor of the gas turbine engine, a first one of the two distinct fuel injection units being selected and optimized for high power demands, whereas a second one of the two distinct fuel injection units being selected and optimized for low power level demands, and controlling a fuel flow ratio between said two distinct injection units as a function of the power level demand.

DESCRIPTION OF THE DRAWINGS

Reference is now made to the accompanying figures, in which:

FIGS. 3a to 3c are graphic representations illustrating the fuel flow distribution between the slinger and the fuel nozzles at different power level conditions.

DETAILED DESCRIPTION OF THE PREFERRED EMBODIMENTS

Figure 1:
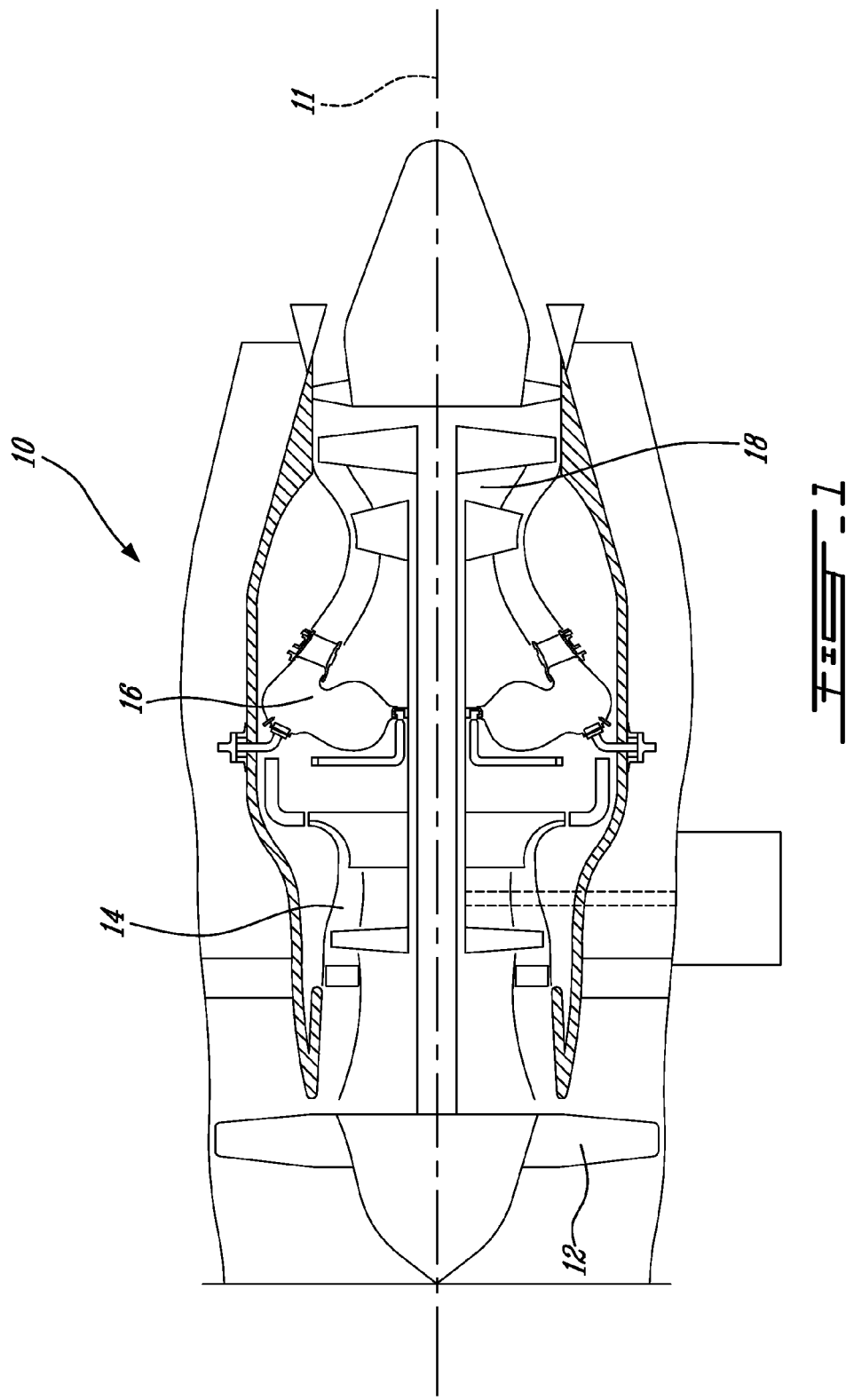
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
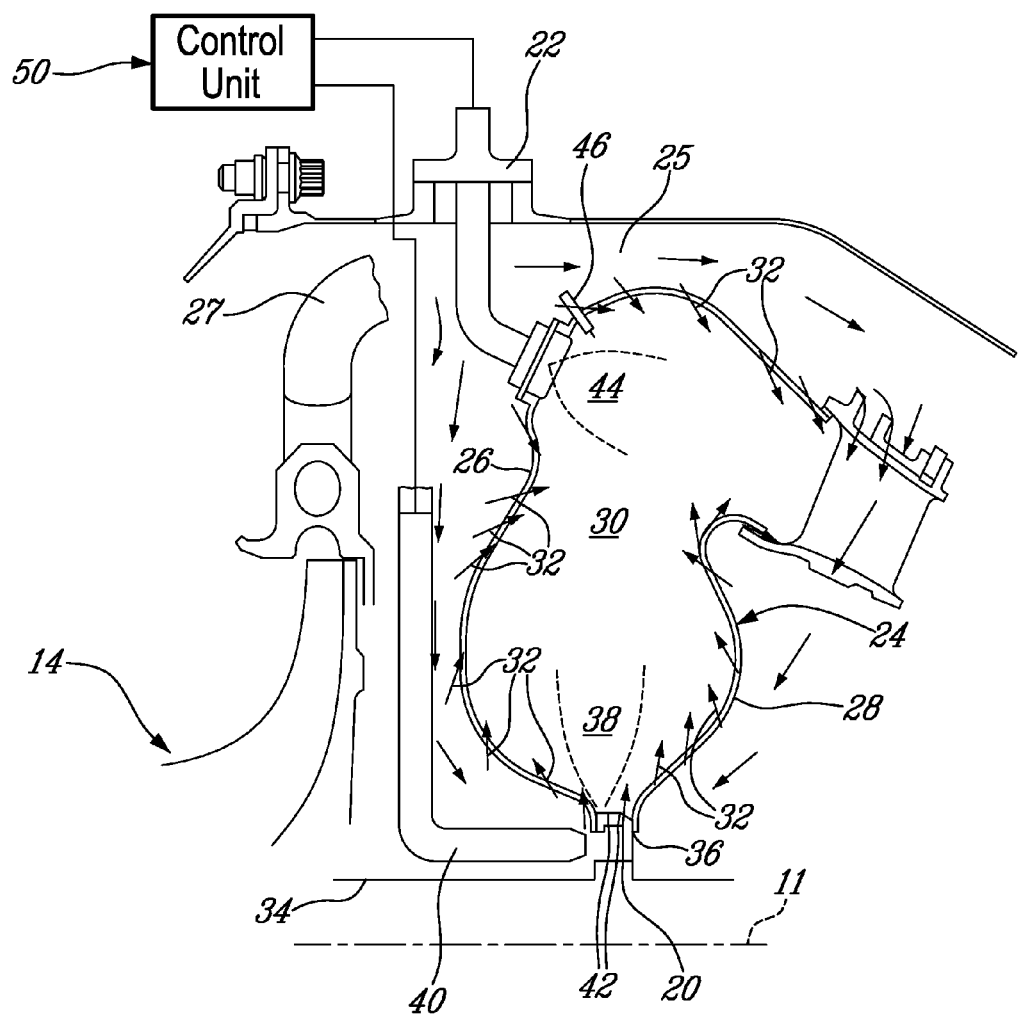
FIG. 2 is a schematic cross-sectional view of the combustor section of the gas turbine engine, the combustor section having a hybrid slinger combustion system including a high power combustion zone supplied with fuel by a slinger and a low power combustion zone supplied with fuel by a set of fuel nozzles.

As can be appreciated from FIG. 2, the combustor 16 is a hybrid slinger combustor combining two distinct fuel injector units, a rotary fuel slinger 20 and a set of spaced-apart fuel nozzles 22. As will be discussed in further details hereinbelow, the rotary fuel slinger 20 may be optimized for high power engine demands, such as a during take-off and climb phases of a flight, while the set of individual fuel nozzles 22 may be optimized for low power engine demands, for example, at ground or flight idle. Under certain flight conditions, such as at cruise power level, the two distinct fuel injector units, the rotary fuel slinger 20 and the set of fuel nozzles 22, may be both used to co-inject fuel according to a predetermined fuel flow ratio.

Referring more particularly to FIG. 2, it can be appreciated that the combustor 16 is housed in a plenum 25 supplied with compressed air from the compressor diffuser 27 of the compressor 14. The combustor 16 has an annular combustor shell 24 concentrically mounted about the engine centerline 11 in the plenum 25. The combustor shell 24 may have a front annular liner 26 and a rear annular liner 28. The front and rear annular liners 26 and 28 are axially spaced-apart to define therebetween a combustion chamber 30. As schematically depicted by flow arrows 32, the front and rear liners 26 and 28 each include a plurality of air inlet openings for allowing air to flow from the plenum 25 into the combustion chamber 30. Cooling holes (not shown) such as effusion cooling holes, may also be defined in the front and rear liners 26 and 28 to provide cooling to the liners 26 and 28.

As schematically shown in FIG. 2, the rotary fuel slinger 20 is mounted for rotation with an engine shaft 34 coupled to the compressor or the turbine rotor. The rotary fuel slinger 20 is axially aligned with a radially inner circumferential opening 36 defined in the combustor shell 24. The rotary fuel slinger 20 is configured to atomize and spray fuel radially outwardly through the circumferential opening 36 into a first combustion zone 38 of the combustor chamber 30. A fuel manifold 40 extends into the plenum 25 for directing a flow of fuel from a fuel source (not shown) to the rotary fuel slinger 20. As the slinger rotates 20, fuel is centrifuged through outlet holes 42 defined in the slinger 20, thereby atomizing the fuel into tiny droplets and evenly distributing the fuel into the first combustion zone 38 of the combustor chamber 30.

The set of individual fuel nozzles 22, which may be of any suitable types, are uniformly circumferentially distributed about the combustions chamber 30 and disposed generally downstream of the rotary slinger 20 relative to the flow of combustion gases through the combustions chamber 30. By way of example, the set of fuel nozzles 22 may be composed of three or four air assisted fuel nozzles (low pressure fuel system). The fuel nozzles 22 extend in respective openings defined in the front liner 26 of the combustor shell 24 and are disposed to spray fuel into a second combustion zone 44 of the combustion chamber 30. The fuel nozzles are connected to the fuel source via any appropriate fuel manifold structures (not shown). The fuel nozzles manifold can be integrated to the slinger fuel manifold. Valves (not shown) may be provided to control the split of fuel flow between the slinger 20 and the fuel nozzles 22.

An appropriate number of igniters (only one being schematically shown in FIG. 2 at 46) are provided to ignite the fuel supplied by both the slinger 20 and the fuel nozzles 22. The igniters 46 may all be disposed to provide spark energy in the second combustion zone 44 only. By using the fuel nozzles 22 in place of the fuel slinger 20 at ground or flight idle, it is possible to eliminate the need for long igniters which are typically required to deliver spark energy very close to conventional slinger systems in order to compensate for the poor atomization provided by the slinger when operated at low rotational speeds. Due to lower number of fuel nozzles, the fuel nozzles internal cavities can be designed to minimize internal carbon formation in addition to the optimized fuel atomization. The fuel nozzle tip orifice and internal passages may be higher than certain size to minimize internal carbon formation on the wall.

As mentioned above, the rotary fuel slinger 20 is suited for high power conditions (e.g. take-off, climb and cruise power levels). The fuel nozzles 22 are mainly used for improved starting/altitude relight and other low power level conditions. The fuel nozzles 22 provide for better fuel atomization than the fuel slinger 20 when the engine 10 is operated at low power levels. Such a hybrid or dual mode injection system allows optimizing a first one of the dual fuel injectors for low power fuel consumption and a second one of the injectors for high power fuel consumption. This provides for improved combustion efficiency and lower smoke emission as compared to conventional slinger combustors.

The split of fuel flow between the rotary fuel slinger 20 and the fuel nozzles 22 is controlled by a control unit 50. The control unit 50 is configured for controlling the flow of fuel to the rotary fuel slinger 20 and the fuel nozzles 22 as a function of the power demand.

Figure 3A:
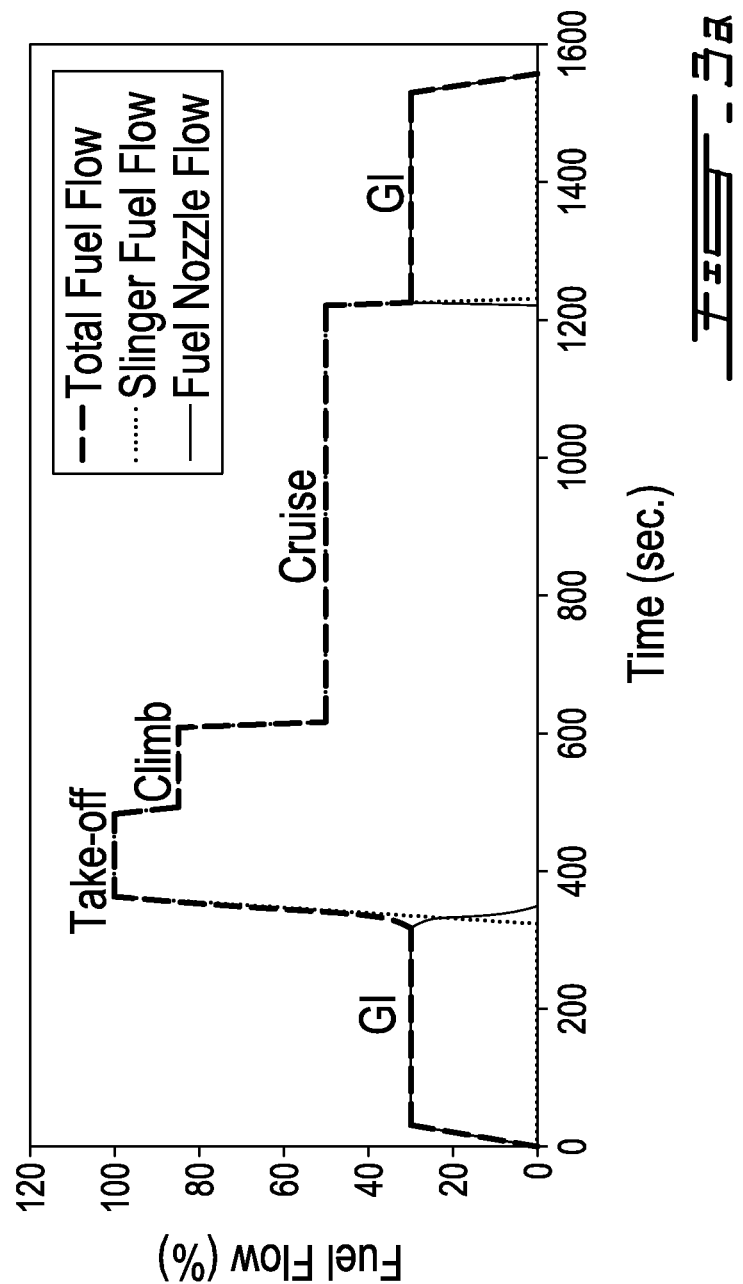
Figure 3C:
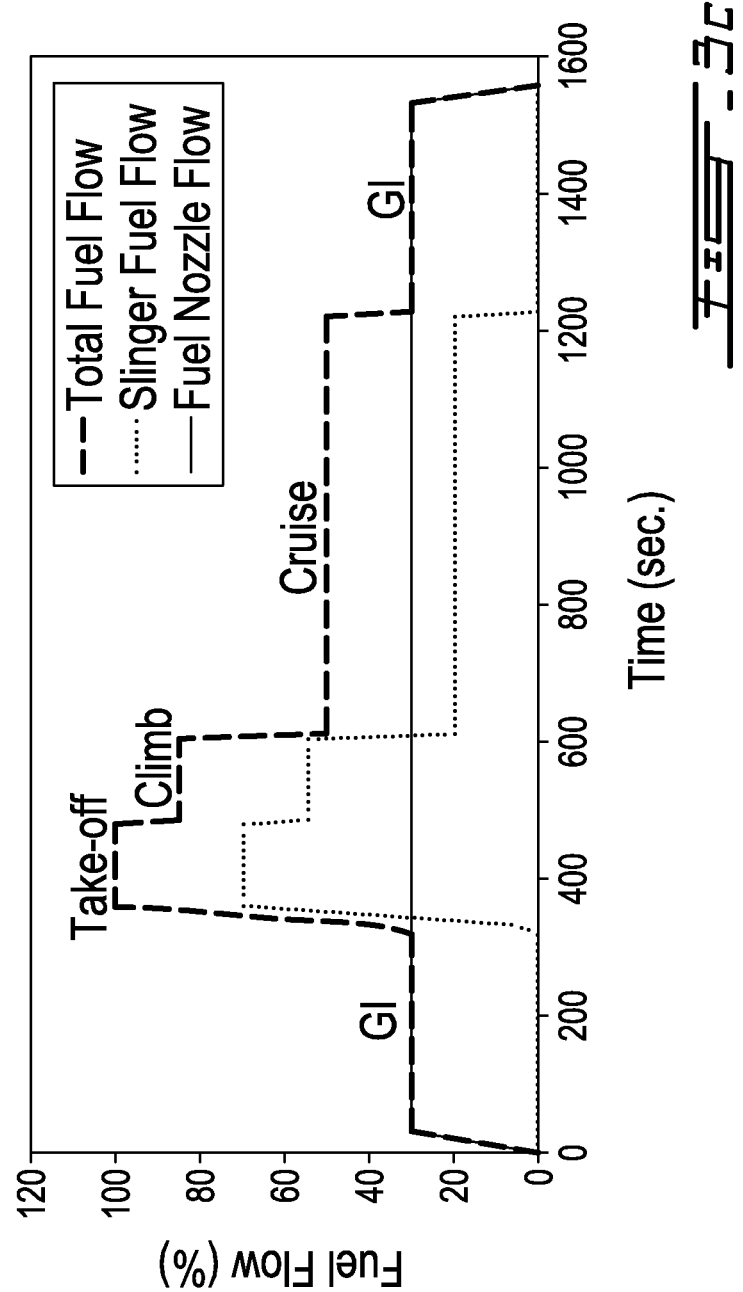

FIGS. 3a to 3c graphically illustrate three possible fuel schedules for the hybrid slinger combustions system, each graph illustrating the relative use of the slinger 20 and the set of fuel nozzles 22 in terms of fuel flow during ground operation and various phases of flight, including: ground idle, take-off, climb, cruise and decent.

According to the first option illustrated in FIG. 3a, at ground idle, the fuel is solely injected into the combustion chamber 30 by the fuel nozzles 22. The fuel flow through the fuel nozzles 22 at ground idle is about 20% to about 35% of the maximum fuel flow (i.e. the take-off fuel flow). The slinger 20 only starts injecting fuel into the combustion chamber 30 during the ground idle to take-off acceleration phase. At the same time, the nozzle fuel flow is reduced to zero. The flow of fuel through the fuel nozzles 22 remains at zero during the various flight phases, including the climb and cruise phases. During flight all the fuel is atomized through the rotary fuel slinger 20. The fuel slinger 20 is thus the primary fuel injector during the flight. At the decent approach, the fuel flow is switched back to the fuel nozzles 22 as during the first ground idle phase of the engine operation.

FIG. 3b illustrates a second option in which the fuel nozzles 22 atomise a small portion (e.g. 10%) of the fuel required during flight. According to this scenario, during flight the fuel nozzles 22 will have fuel just enough to maintain a flame. The amount of fuel through the rotary fuel slinger 20 during flight will total the required amount of fuel minus the fuel flowing through the fuel nozzles 22.

FIG. 3c illustrates a third option in which through out the engine running, the fuel nozzles 22 will have the ground idle fuel flow condition (i.e. the fuel flow will remain constant at about 30% to 35% of the maximum fuel flow). Again, the fuel will be supplied to the rotary slinger 20 at the beginning of the ground idle to take-off acceleration phase. During flight, the slinger fuel flow will total the required fuel flow minus the fuel through the fuel nozzles 22 (the ground idle fuel flow).

As can be appreciated from the description of FIGS. 3a to 3c, the fuel flow ratio between the rotary slinger 20 and the fuel nozzles 22 is controlled by the control unit 50 as a function of the variation of the power demand over a full range of engine power settings.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. A method of operating a combustor of a gas turbine engine powering an aircraft, comprising: selectively using two distinct fuel injection units or a combination thereof for spraying fuel in a same combustion chamber of the combustor of the gas turbine engine, a first one of the two distinct fuel injection units being a rotary fuel slinger, whereas a second one of the two distinct fuel injection units includes a set of fuel nozzles; and controlling a fuel flow ratio between said two distinct injection units as a function of the power level demand, comprising supplying a major portion of the fuel to be atomized to said rotary fuel slinger during take-off and climb phases of a flight, and directing the major portion of the fuel flow to the fuel nozzles at ground idle.

2. The method defined in claim 1, wherein during flight, a major portion of the fuel is atomized through the rotary fuel slinger.

3. The method defined in claim 1, comprising initiating fuel flow through the rotary fuel slinger during acceleration from ground idle to take-off.

4. The method defined in claim 1, wherein at cruise power level, fuel is co-injected via the rotary fuel slinger and the fuel nozzles.

5. The method defined in claim 1, wherein the rotary fuel slinger injects the fuel upstream of the fuel nozzles in the combustion chamber.

* * * * *